United States Patent [19]

Maytum

[11] Patent Number: 5,161,183

[45] Date of Patent: Nov. 3, 1992

[54] OVERVOLTAGE PROTECTION CIRCUITS

[75] Inventor: Michael Maytum, Bedford, England

[73] Assignee: Texas Instruments Incorporated, Dallas, Tex.

[21] Appl. No.: 410,439

[22] Filed: Sep. 21, 1989

[30] Foreign Application Priority Data

Nov. 11, 1988 [GB] United Kingdom ............... 8826481

[51] Int. Cl.$^5$ .................... H02H 9/04; H04M 7/00
[52] U.S. Cl. ................... 379/412; 361/119; 361/91; 379/331; 379/413
[58] Field of Search .............. 379/412, 413, 331, 332; 361/119, 91, 56

[56] References Cited

U.S. PATENT DOCUMENTS

| | | | |
|---|---|---|---|
| 3,181,033 | 11/1961 | Bakker | 361/119 |
| 3,436,601 | 6/1965 | Dyre | 379/412 X |
| 4,282,555 | 8/1981 | Svedberg | 361/91 X |
| 4,341,991 | 7/1982 | Geboers et al. | 379/413 |
| 4,440,980 | 4/1984 | Bakker | 379/412 X |
| 4,456,940 | 6/1984 | Hammerberg et al. | 361/119 X |
| 4,571,656 | 2/1986 | Ruckman | 361/119 X |
| 4,661,878 | 4/1987 | Brown et al. | 379/412 X |
| 4,661,979 | 4/1987 | Jakab | 379/412 |
| 4,695,916 | 9/1987 | Satoh et al. | 361/119 X |
| 4,720,845 | 1/1988 | Lechner et al. | 361/119 X |
| 4,758,920 | 7/1988 | McCartney | 361/119 |
| 4,876,620 | 10/1989 | Borkowicz | 379/412 X |
| 4,907,120 | 3/1990 | Kaczmarek et al. | 361/119 |

Primary Examiner—James L. Dwyer
Assistant Examiner—Magdy W. Shehata
Attorney, Agent, or Firm—Russell E. Baumann; Richard L. Donaldson; Rene E. Grossman

[57] ABSTRACT

An overvoltage protection circuit for a pair of conductors carrying a balanced signal includes two similar protection elements connected in series between the conductors and two equal value resistors respectively connected in parallel with the elements, so that the junction point of the two elements is at a voltage midway between the voltages on the conductors and the protection elements present equal capacitances to the conductors. A third protection element is connected from the junction point of the two elements to ground to protect against excessive voltages relative to ground on the conductors. The voltage division provided by the resistors may be adjusted to improve the balance of the capacitances presented by the two protection elements.

10 Claims, 1 Drawing Sheet

OVERVOLTAGE PROTECTION CIRCUITS

BACKGROUND OF THE INVENTION

The present invention relates to an overvoltage protection circuit and is especially but not exclusively suited to use in a telephone line.

A telephone line from a telephone exchange to the subscriber's apparatus carries the voice signal and also a power supply to the subscriber's apparatus. Usually, the power supply consists of a d.c. voltage of about 40 volts. Hitherto, the voice signal has been an analogue signal representing the waveform of the voice. In future developments of telephone systems the analogue voice signal is to be replaced by a digital signal and in accordance with the ISDN (integrated services digital network) system the bit rate of the digital voice signal is 144 k bits/s and higher bit rates. Imbalance of the conductors of a telephone line is not troublesome for the analogue voice signal since the frequencies involved are less than 5 kHz and although some of the control signals transmitted down the line use frequencies up to 20 kHz no significant interference or other difficulties have been encountered. On the other hand, when high bit rate digital data is transmitted along a telephone line it is very important that the line is balanced so that radiation of the data signals and the picking up of interfering signals is avoided. To this end, there are specific requirements laid down in certain countries defining the permissible degree of imbalance between the conductors of a telephone line. In Germany, for instance, the requirement is that the balance should be better than $-66$ dB (1 in 2000).

Overvoltage protectors are commonly provided in telephone lines to limit the voltage on the line relative to ground and differential voltage between the conductors of the line, the requirement for such protectors being made more important by the increasing use of semiconductor circuitry in telephone apparatus in place of the hybrid transformers and other similarly robust but bulky components.

FIG. 1 as described below shows an example of a conventional overvoltage protection circuit connected to a telephone line.

In FIG. 1, data to be carried by the telephone line from an exchange is applied to a winding 1 of a transformer 2 having two similar windings 3 and 4 coupled to the winding 1. The telephone line itself consists of a conductor 5 and a conductor 6 connected to the windings 3 and 4 respectively, the other ends of which windings are connected through a filter 7 to conductors 8 and 9 to which supply voltages of 0 volts and $-40$ volts are respectively applied. In the subscriber's apparatus the conductors 5 and 6 are respectively connected to windings 10 and 11 of a transformer 12 which has a further winding 13 connected to the subscriber's handset. The other ends of the windings 10 and 11 are connected through a filter 14 to conductors 15 and 16 where the 0 volt and $-40$ volt levels are produced for use in powering other circuitry int he subscriber's apparatus (not shown).

In order to protect the circuitry connected to the conductors 5 and 6 against excessively high voltages applied to those conductors, for example as a result of a lightning strike, overvoltage protectors P1 and P2 are provided connected in series, with the junction point 17 of the two protectors connected to ground. The protectors P1 and P2 provide overvoltage protection against an excessively high voltage differential between the conductors 5 and 6, and also against an excessively high voltage relative to ground on either of the conductors 5 and 6.

Commonly used types of voltage protector include reverse biassed PN junctions, so that in such a protector when in use a depletion layer is set up at the junction, the thickness of which layer will depend upon the voltage applied across the protector. If the voltage across the protector is close to 0 volts, then the thickness of the depletion layer will be small with the result that the protector will have a high capacitance. On the other hand, if a relatively high voltage, but not one sufficient to cause the protector to conduct, were to be applied to the protector, the depletion layer would be thicker and consequently the capacitance presented by the protector would be relatively small. The conductor 5, which is maintained at 0 volts by the exchange equipment, has, at the point where the protector P1 is connected to it, a voltage close to that of ground, differing from ground potential only as a result of the voltage drop along the conductor due to current in it. Therefore the protector P1 will present a relatively high capacitance C1, shown in dotted form in FIG. 1. The conductor 6, on the other hand, is at a potential close to $-40$ volts so that the protector P2 has a relatively smaller capacitance C2. The difference between the values of capacitances C1 and C2 leads to imbalance of the conductors 5 and 6 of the telephone line. Whilst this imbalance would, as mentioned above, be acceptable when the telephone line is carrying relatively low frequency signals (less than 20 kHz), it would not be acceptable when the line is carrying digital signals of 144 kilobits/s or of a higher rate.

Alternative forms of overvoltage protectors such as gas discharge tubes have a low capacitance, but whilst they could be used in the application described above, they would not provide such effective overvoltage protection as semiconductor devices using reverse biassed PN junctions.

The imbalance between the capacitances presented by the protectors P1 and P2 could be corrected by connecting a trimmer capacitance in parallel with the protector P2 (that presenting the lower capacitance), but this solution to the problem has three disadvantages. The first disadvantage is that the balance of the conductors of the line is strongly influenced by the value of the d.c. supply voltage, and it also varies with temperature which means that accurate balance cannot be maintained. A second disadvantage is that the trimmer capacitance would need to be adjusted separately for each individual protection circuit. Thirdly, the specification for the telephone system may require that a power failure produces the reversal of the supply voltages on the line and that would completely invalidate any fixed compensation of this kind.

SUMMARY OF THE INVENTION

It is an object of the present invention to provide an overvoltage protection circuit which maintains capacitive balance.

According to the present invention there is provided an overvoltage protection circuit having a pair of conductors for conveying a balanced signal, a pair of semiconductor protection elements of the same type connected in series and in the same sense between the pair of conductors, two resistors of substantially equal value respectively connected in parallel with the protection elements of the pair, and a third semiconductor protection element connected from the junction of the pair of protection elements to a point of reference potential, the system being such that in use the protection elements present substantially equal capacitances from the conductors of the pair to the point of reference potential.

The pair of protection elements may each include a PN junction which in operation is reverse biassed, so that a depletion region is formed having a thickness which is dependent on the voltage applied to the element. The two resistors serve to divide the differential between the voltages on the pair of protection elements into substantially equal parts which are applied respectively across the elements of the pair of protection elements so that the capacitances presented by those elements are substantially equal. The protection elements of the pair may be 4-layer diodes.

The third protection element may also be a 4-layer diode or it may be a zener diode or an avalanche diode.

One or both of the two resistors may include adjustment means enabling the value or values to be adjusted so as to render the capacitances presented by the pair of protection elements more nearly equal to each other than they would be if equal voltages were to be applied to the pair of elements.

An overvoltage protection circuit according to the invention is especially but not exclusively suited to use in a telephone line carrying both digital data and a d.c. power supply.

DESCRIPTION OF THE PREFERRED EMBODIMENTS

Figure 1:
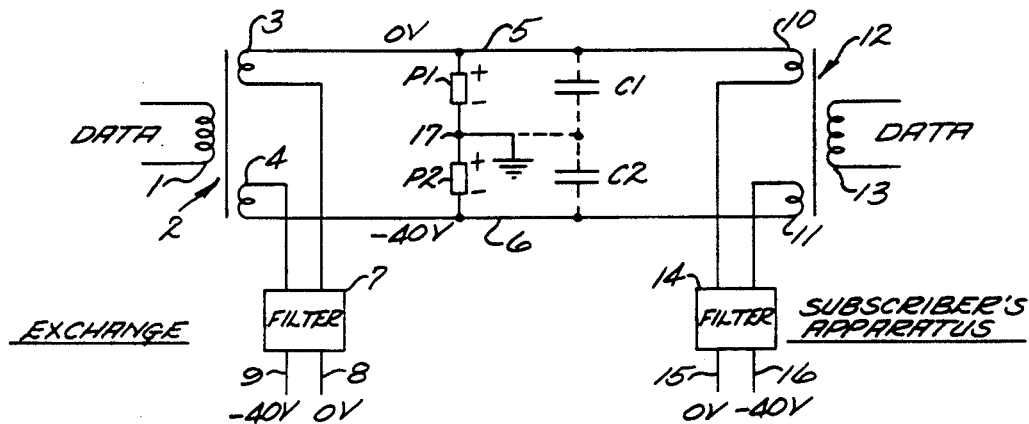
FIG. 1 is a diagram of a conventional overvoltage protection circuit used in a telephone line as described above.
Figure 2:
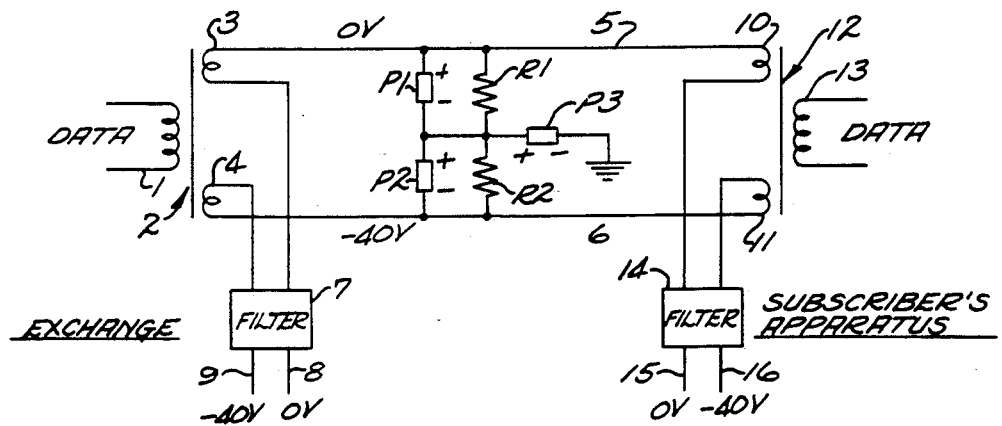
FIG. 2 is a diagram of an example of an overvoltage protection circuit according to the present invention in a telephone line.

Referring now to FIG. 2, in which components corresponding to those used in FIG. 1 carry the same reference numerals as in that Figure, the protectors P1 and P2 are respectively shunted by resistors R1 and R2 of substantially equal value, and the junction point 18 of the protectors P1 and P2 is connected through a third protector P3 to ground. In contrast to this, the junction point 17 of FIG. 1 is connected directly to ground.

In the operation of the protector circuit shown in FIG. 2, the resistors R1 and R2 serve to establish at the point 18 a voltage midway between the voltages on the conductors 5 and 6, so that the voltages across each of the protectors P1 and P2 are equal, with the protector P3 completing the connection to ground. The protector P3 allows the junction point 18 to assume a voltage midway between the voltages on the conductors 5 and 6 and at the same time provides an overvoltage protection path to ground through the protectors P1 and P2. The protectors P1 and P2 are of the same type and may, for example, be 4-layer diodes of type Texas Instruments TIS P40-82 of TISP 1082. The protector P3 may be of the same type as the protectors P1 and P2, or it may be a zener diode or an avalanche diode having an appropriate threshold voltage. It should be noted that the protectors P1 and P2 are connected in the same polarity sense in the series because, in general, semiconductor voltage protectors are not symmetrical in their voltage-capacitance characteristics so that it is important in making their capacitances equal to one another that the protectors are biassed with the same polarity and are both operating in the same part of the voltage-capacitance characteristic.

The leakage currents of the protectors P1 and P2 when not rendered conducting by the presence of an excessive voltage across them are of the order of 10 namp so that the values of the resistors R1 and R2, necessary to establish a voltage on the junction point 18 which is midway between those on the conductors 5 and 6, can be of several megohms, which represents only a negligible loading on the supply voltage on the conductors 5 and 6.

In a typical case, the protectors P1 and P2 have a threshold voltage of ±25 volts allowing the voltage differential between the conductors 5 and 6 to rise to ±50 volts before they conduct. The protector P3 may also have a threshold voltage of ±25 volts.

Because the protectors P1 and P2 are of the same type and are biassed with the same polarity and voltage level, their capacitances will be very similar in value, probably closer than 0.5 per cent. Because the capacitance of the protector P3 is common to both conductors 5 and 6, being connected in series with the protectors P1 and P2, it follows that it is only necessary to make the capacitances of protectors P1 and P2 very close in value to ensure the required substantially equal capacitive loading on the conductors 5 and 6. The a.c. impedance of the protector P3 does not affect the balance of the line because substantially no signal appears at the junction point 18 because of the equal capacitances provided by the protectors P1 and P2.

In a test of the circuit shown in FIG. 2 using randomly selected components, the balance of the line was better than −80 dB at 500 kHz. Removal of the resistors R1 and R2 and the protector P3 to produce a conventional protection circuit, as shown in FIG. 1, increased the imbalance of the line to −45 kB, that is to say, some 56 times greater than that of the circuit of FIG. 2.

There will be small discrepancies between the voltage capacitance characteristics of two nominally identical protectors but, as mentioned above, these discrepancies will not in general produce a sufficiently large imbalance between the capacitive loadings on the conductors of the line to be troublesome when used in the circuit shown in FIG. 2. The balance could be improved still further by providing adjustment of one or both of the resistors R1 and R2 to make the capacitances of the protectors P1 and P2 more nearly equal. This adjustment would be made for the expected working voltage differential between the conductors of the line.

Overvoltage protection for the differential voltage between the conductors 5 and 6 is provided by the protectors P1 and P2. Protection for the conductor 5 to ground is provided by the protectors P1 and P3 and for the conductor 6 to ground by the protectors P2 and P3. If both conductors 5 and 6 suffer the same overvoltage stress relative to ground, the protector P3 would receive the sum of the currents from protectors P1 and P2. It follows therefore that for this type of stress the current rating of the protector P3 should be twice that of the protectors P1 and P2.

Although the protection circuit has been described with reference to an embodiment using 4-layer diodes as the protectors P1 and P2, it could use any type of semiconductor overvoltage protector of which the capacitance varies with voltage. Such other protectors include forward biassed diodes, zener diodes avalanche diodes and fallback diodes (3-layer diodes). In the circuit described a 4-layer diode has the advantage that it can survive higher currents through it than other types of protectors of the same area of silicon.

As mentioned above, the protector P3 has a ±25 volt threshold voltage, the same as the threshold voltages of the protectors P1 and P2. It would be possible to use as the protector P3 a device having an asymmetrical characteristic, for example a 1 volt threshold (a forward biassed diode characteristic) for positive voltages and a 25 volt threshold for negative voltages, this would give conductor to ground voltage protection levels of 25+1=26 volts and −50 volts. The inter-conductor protection level is set by the protectors P1 and P2 and would remain at ±50 volts.

When used to protect telephone line circuitry a protection circuit may be located in the exchange or in the subscriber's apparatus or in both places. It may be useful to include additional protection circuits at one or more places along the telephone line.

I claim:

1. An overvoltage protection circuit having a pair of conductors for covering a balanced signal, a pair of semiconductor protection elements of the same type connected to form a junction therebetween, the pair of elements being connected in series and in the same sense between the pair of conductors, two resistors of substantially equal value respectively connected in parallel with the protection elements of the pair, and a third semiconductor protection element connected from the junction of the pair of protection elements to a point of reference potential, the circuit being such that in use the protection elements present substantially equal capacitances from the conductors of the pair to the point of reference potential.

2. A circuit according to claim 1 wherein each protection element of the pair of protection elements includes a PN junction which in operation is reverse biassed so that a depletion region is formed having a thickness which is dependent on the voltage applied to the element, and the two resistors provide continuous current paths in parallel with the respective protection elements and serve to divide any difference between the voltages on the pair of conductors into two substantially equal parts which are applied respectively across the pair of protection elements so that capacitances presented by those elements are substantially equal.

3. A circuit according to claim 2, wherein each protection element of the pair of protection elements presenting the substantially equal capacitances in a zener diode, an avalanche diode or a 4-layer diode.

4. A circuit according to claim 3, wherein the third protection element is a zener diode, an avalanche diode or a 4-layer diode.

5. A circuit according to any preceding claim further including means for adjusting voltage division provided by the two resistors to enable the capacitances presented by the pair of protection elements to be made more nearly equal to each other than when equal voltages are applied to the elements.

6. A telephone line circuit including at least one overvoltage protection circuit according to claim 1.

7. A telephone line circuit including at least one overvoltage protection circuit according to claim 2.

8. A telephone line circuit including at least one overvoltage protection circuit according to claim 3.

9. A telephone line circuit including at least one overvoltage protection circuit according to claim 4.

10. A telephone line circuit including at least one overvoltage protection circuit according to claim 5.

* * * * *